United States Patent
Machida et al.

(10) Patent No.: US 8,349,974 B2
(45) Date of Patent: Jan. 8, 2013

(54) BIAXIALLY ORIENTED POLYARYLENE SULFIDE FILM AND METHOD FOR PRODUCING THE SAME

(75) Inventors: Tetsuya Machida, Shiga (JP);
Masatoshi Ohkura, Shiga (JP);
Yasuyuki Imanishi, Shiga (JP)

(73) Assignee: Toray Industries, Inc. (JP)

( * ) Notice: Subject to any disclaimer, the term of this patent is extended or adjusted under 35 U.S.C. 154(b) by 352 days.

(21) Appl. No.: 12/599,305

(22) PCT Filed: May 7, 2008

(86) PCT No.: PCT/JP2008/058460
§ 371 (c)(1),
(2), (4) Date: Nov. 9, 2009

(87) PCT Pub. No.: WO2008/139989
PCT Pub. Date: Nov. 20, 2008

(65) Prior Publication Data
US 2010/0209712 A1 Aug. 19, 2010

(30) Foreign Application Priority Data
May 9, 2007 (JP) .................... 2007-124340

(51) Int. Cl.
*C08F 283/00* (2006.01)
(52) U.S. Cl. ........ 525/537; 525/535; 528/389; 528/388; 528/488; 528/489; 528/499; 528/374; 428/419; 264/234
(58) Field of Classification Search .................. 428/419; 528/389, 388, 488, 489, 499, 374; 264/234; 525/535, 537
See application file for complete search history.

(56) References Cited

U.S. PATENT DOCUMENTS

| | | | |
|---|---|---|---|
| 3,919,177 A | 11/1975 | Campbell | |
| 2007/0299219 A1* | 12/2007 | Higashioji et al. | 525/535 |

FOREIGN PATENT DOCUMENTS

| | | |
|---|---|---|
| EP | 2 025 705 A1 | 2/2009 |
| JP | 45-3368 B | 2/1970 |
| JP | 52-012240 B | 4/1977 |
| JP | 55-035456 | 3/1980 |
| JP | 57-205118 A | 12/1982 |
| JP | 59-155462 | 9/1984 |
| JP | 61-007332 A | 1/1986 |
| JP | 62-121761 | 6/1987 |
| JP | 63-189458 | 8/1988 |
| JP | 63-260426 | 10/1988 |
| JP | 02-117925 A | 5/1990 |
| JP | 03-081367 | 4/1991 |
| JP | 4-142918 A | 5/1992 |
| JP | 04-146935 | 5/1992 |
| JP | 06-305019 | 11/1994 |
| JP | 06-322151 A | 11/1994 |
| JP | 2001-302918 A | 10/2001 |
| JP | 2006-199734 * | 8/2006 |
| JP | 2006-199734 A | 8/2006 |
| JP | 2007-098941 * | 4/2007 |
| JP | 2007-098941 A | 4/2007 |
| WO | 2007/129721 A1 | 11/2007 |

* cited by examiner

*Primary Examiner* — Shane Fang
(74) *Attorney, Agent, or Firm* — DLA Piper LLP (US)

(57) ABSTRACT

A biaxially oriented polyarylene sulfide film which has an excellent elongation at break and flatness is provided. The biaxially oriented film may be a biaxially oriented polyarylene sulfide film which is substantially composed of a polyarylene sulfide resin (A), wherein one of the elongations at break in the machine direction and in the transverse direction of the film is not lower than 110%; one of the breaking stresses in the machine direction and in the transverse direction of the film of the film is not higher than 200 MPa; and both of the heat shrinkage ratio in the machine direction of the film and that in the transverse direction of the film at 260° C. for 10 minutes are not less than 0% and not more than 10%.

15 Claims, No Drawings

BIAXIALLY ORIENTED POLYARYLENE SULFIDE FILM AND METHOD FOR PRODUCING THE SAME

RELATED APPLICATIONS

This is a §371 of International Application No. PCT/JP2008/058460, with an international filing date of May 7, 2008 (WO 2008/139989 A1, published Nov. 20, 2008), which is based on Japanese Patent Application No. 2007-124340, filed May 9, 2007, the subject matter of which is incorporated by reference.

TECHNICAL FIELD

This disclosure relates to a biaxially oriented polyarylene sulfide film having excellent elongation at break and flatness. The biaxially oriented polyarylene sulfide film can be used in an electrical insulating material for a motor, a transformer, an insulated cable or the like, a molding material, a circuit board material, a process/release film such as circuit/optical element or the like, and a protective film, a lithium ion battery material, a fuel battery material, a speaker diaphragm or the like. More specifically, the disclosure relates to a biaxially oriented polyarylene sulfide film having excellent moldability which can be preferably used in an electrical insulating material for a hot-water supplier motor, a motor for car air conditioner and a driving motor used in a hybrid car, and a speaker diaphragm for cell-phone, and a method for producing the film.

BACKGROUND

In electrical insulating materials for motors, it has recently demanded to have heat resistance at high temperature and hydrolysis resistance. For example, from an environmental problem in connection with abolition of specific chlorofluorocarbons, new alternatives for cooling medium have been proposed for motors used in refrigerators and air conditioners, however, the alternative cooling medium and lubricant oil used for refrigerators and air conditioners easily absorb water. Therefore, there is a demand for hydrolysis resistance in addition to heat resistance for electrical insulating materials used for refrigerators and air conditioners. In electrical insulating materials for motors used in hybrid cars, water is infiltrated into the materials under usage environment, so there is a demand for hydrolysis resistance in addition to heat resistance.

As a diaphragm for acoustic equipment or the like made of plastic, polyethylene terephthalate (PET) film is used, and a diaphragm for acoustic equipment employing polyethylene naphthalate (PEN) or polyether imide (PEI) which has more excellent heat resistance and rigidity than that of PET is also used.

However, the diaphragm for acoustic equipment employing PET has insufficient heat resistance when used for a small diameter speaker such as a speaker for a cellular phone because the diaphragm is likely to thermally deforms at temperatures not lower than 65° C. On the other hand, although the diaphragms for acoustic equipment using PEN has a better heat resistance than those using PET, their heat resistance is not still sufficient. The diaphragm for acoustic equipment employing PEI has problems in that rolling or sound distortion is likely to occur depending on the shape of the speaker diaphragm so that the audio characteristics are poor, and when the external output is high, the film may not withstand the output and may break.

Since a polyarylene sulfide film has characteristics such as excellent heat resistance, flame retardancy, rigidity, chemical resistance, electrical insulation and low moisture absorption, application of the film to electrical insulating materials and to speaker diaphragms is now being developed. For example, (1) the biaxially oriented films are known to be employed as electrical insulating materials (see Japanese Unexamined Patent Publication No. 1980-35456). (2) As polyarylene sulfide films, acoustic diaphragm films made of PPS films are proposed (see Japanese Unexamined Patent Publication No. 1994-305019).

However, the conventional film and sheet described above have the following problems. That is, the film in the item (1) above may be unsatisfactory in tensile elongation at break, ductility, and when used for example as a motor slot liner or as a wedge, causes film breakage or the like in some cases. The film in the item (2) above is poor in tensile elongation at break and there is a problem in that film breakage occurs in the molding process.

As described above, the polyphenylene sulfide film is poor in tensile elongation at break and ductility, thus making its applications limited at present, and its improvement is strongly desired. For a method of improving its ductility, a resin composition or a film having other thermoplastic resin mixed in polyphenylene sulfide resin is proposed. For example, employing polyphenylene sulfide (hereinafter also referred to as "PPS") as a polyarylene sulfide, a composition comprising nylon 11 and nylon 12 dispersed as particles having an average dispersion diameter of 1 μm or less (see Japanese Unexamined Patent Publication No. 1991-81367), a composition comprising PPS, polyamide and epoxy resin (see Japanese Unexamined Patent Publication No. 1984-155462), a composition comprising PPS and polyamide (see Japanese Unexamined Patent Publication Nos. 1988-189458 and 2001-302918), a film comprising PPS and polyether imide (see Japanese Unexamined Patent Publication No. 1992-146935), a film comprising PPS and polysulfone (see Japanese Unexamined Patent Publication No. 1987-121761) or the like are disclosed, but they do not have sufficient film-forming stability, and substantially the improvements are not due to PPS alone. A biaxially oriented film in which metaphenylene sulfide units are copolymerized or blended in the polyphenylene sulfide (see Japanese Unexamined Patent Publication No. 1988-260426) is disclosed, but the heat shrinkage ratio of the area of the film is as high as 20% at 230° C. and the heat resistance of the film was not sufficient.

It could therefore be helpful to provide a biaxially oriented polyarylene sulfide film which has an excellent elongation at break and flatness.

SUMMARY

The biaxially oriented film is a biaxially oriented polyarylene sulfide film which is essentially comprised of a polyarylene sulfide resin (A), wherein one of the elongations at break in the machine direction and in the transverse direction of the film of the film is not lower than 110%; one of the breaking stresses in the machine direction and in the transverse direction of the film is not higher than 200 MPa; and both of the heat shrinkage ratio in the machine direction of the film and that in the transverse direction of the film at 260° C. for 10 minutes are not less than 0% and not more than 10%. The biaxially oriented film is also a biaxially oriented polyarylene sulfide film, wherein both of the average elongation at break in the machine direction of the film and that in the transverse direction of the film is not lower than 110%; both of the average breaking stress in the machine direction of the film and that in the transverse direction of the film are not higher than 200 MPa; and both of the heat shrinkage ratio in the machine direction of the film and that in the transverse direction of the film at 260° C. for 10 minutes are not less than 0% and not more than 10%. A method for producing a biaxially oriented polyarylene sulfide film, the method comprising stretching the film in the machine direction and the transverse direction such that the area stretching ratio is not more than 13-times and heat-setting the film after the stretching in not less than 2 steps each at different temperatures, wherein the temperature of the heat-setting process in the first step is not lower than 160° C. and not higher than 220° C. and the temperature of the heat-setting process in the second step is not lower than 240° C. and not higher than 280° C. is provided.

DETAILED DESCRIPTION

More specifically, the biaxially oriented polyarylene sulfide film will now be described. As used herein, the polyarylene sulfide is a homopolymer or copolymer having a repeating unit —(Ar—S)—. Ar includes structural units represented by the following formula (A) to (K):

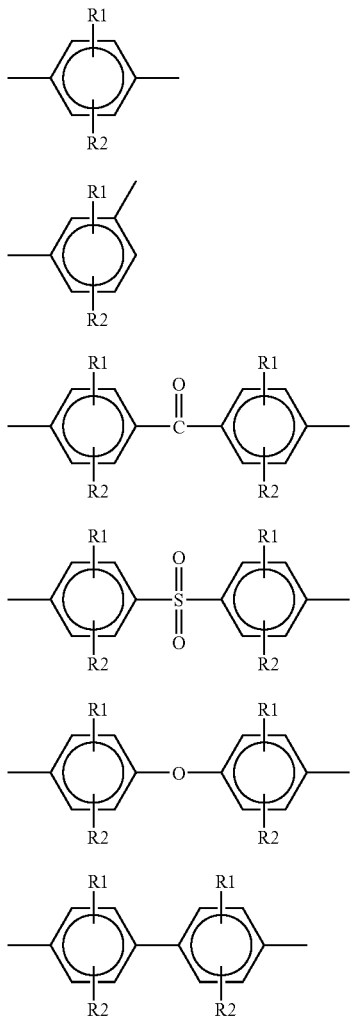

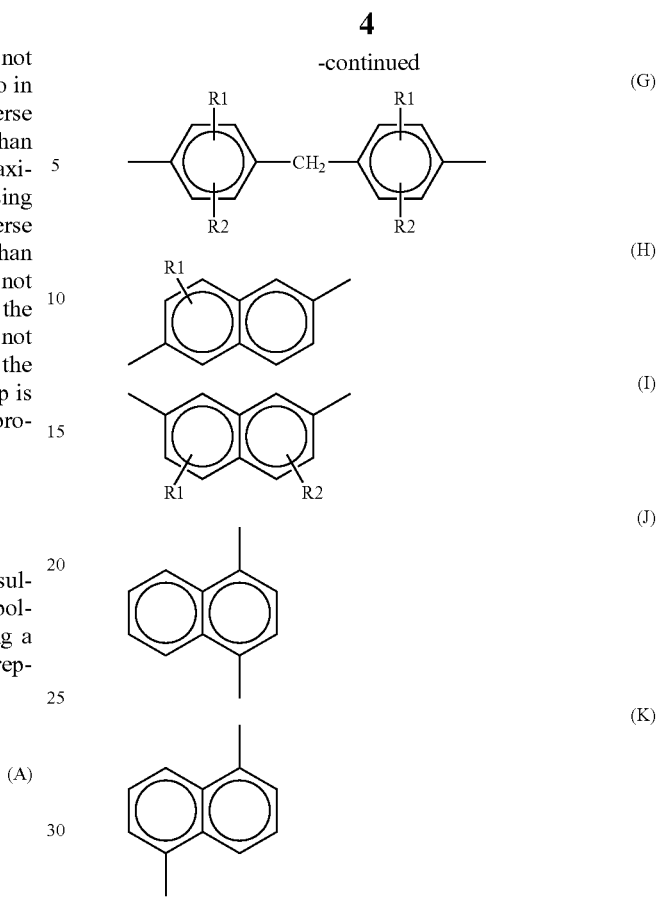

wherein R1 and R2 each represent a substituent group selected from hydrogen, alkyl groups, alkoxy groups and halogens; and R1 and R2 may be the same or different.

The repeating units in the polyarylene sulfide preferably have a structure represented by the above formula (A). Representative examples thereof include polyphenylene sulfide, polyphenylene sulfide sulfone, polyphenylene sulfide ketone, random copolymers and block copolymers thereof and mixtures thereof. From the viewpoint of properties of the film and economic efficiency, polyphenylene sulfide (PPS) is particularly preferably exemplified as the polyarylene sulfide. The polyarylene sulfide preferably contains, as repeating units of the above-described polyarylene sulfide, not less than 80 mol %, more preferably not less than 90 mol %, and still more preferably not less than 95% of the para-arylene sulfide units represented by the following structural formula. When such a para-phenylene sulfide component is less than 80 mol %, the crystallinity and heat transfer temperature of the polymer are low, and the properties of the polyarylene sulfide, that is, heat resistance, dimensional stability, mechanical properties and dielectric characteristics may be deteriorated.

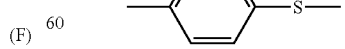

In the above-mentioned polyarylene sulfide, other copolymerizable sulfide linkage-containing units may be contained in an amount of less than 20 mol % based on the total repeating units. Examples of the copolymerizable repeating units include, for example, trifunctional units, ether units, sulfone units, ketone units, meta-linkage units, aryl units having a substituent group(s) such as an alkyl group(s), biphenyl unit, terphenylene unit, vinylene unit and carbonate unit, and specific examples include the following structural units. Among these units, one or more units can be coexistent to constitute the resin. In this case, the structural units may be copolymerized to form a random or block copolymer.

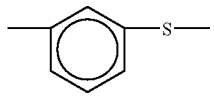

The term "substantially composed of a polyarylene sulfide resin (A)" herein means "comprises the polyarylene sulfide resin in an amount of not less than 99.5 wt % excluding inorganic components."

The melt viscosity of the polyarylene sulfide resin composition (A) is not restricted as long as melt kneading can be carried out, and preferably in the range between 100 poise and 20,000 poise, more preferably in the range between 1000 poise and 10,000 poise at 315° C. at a shear rate of 1,000(1/sec).

As a polyarylene sulfide, polyphynylene sulfide (hereinafter also referred to as "PPS" for short) may be preferably employed. The PPS can be produced by various methods, for example, the method described in JP 45-3368 B by which a polymer having a relatively small molecular weight is obtained; or by the method described in JP 52-12240 B or JP 61-7332 A by which a polymer having a relatively large molecular weight is obtained.

Obtained PPS resin may be used after various treatments such as crosslinking/increasing molecular weight by heating in the air; heat treatment in an inert gas atmosphere such as nitrogen or under reduced pressure; washing with an organic solvent, hot water or an aqueous acid solution; activation by a functional group-containing compound such as an acid anhydride, amine, isocyanate or functional disulfide compound; and the like.

A production process of PPS resin will now be exemplified, but the production process is not restricted thereto. A copolymerization component(s) such as a trihalobenzene may be incorporated as required. Caustic potassium, alkaline metal carboxylate or the like as a polymerization degree adjusting agent is added and polymerization reaction is allowed to occur at 230° C. to 280° C. After the polymerization, the polymer is cooled and the polymer in the form of an aqueous slurry is filtered to obtain the polymer in the form of granules. The resulting polymer is stirred in an aqueous solution of an acetic acid salt or the like at 30° C. to 100° C. for 10 to 60 minutes, and washed with ion-exchanged water several times at 30° C. to 80° C., followed by drying to obtain PPS powder. After washing the obtained powdery polymer with NMP under an oxygen partial pressure of not higher than 10 Ton, preferably not higher than 5 Ton, the polymer is washed several times with ion-exchanged water at 30° C. to 80° C., and dried under reduced pressure of not higher than 5 Torr. Since the thus obtained polymer is substantially linear PPS polymer, stable film-formation by stretching can be attained. Needless to say, as required, other macromolecular compound(s); inorganic and organic compound(s) such as silicon oxide, magnesium oxide, calcium carbonate, titanium oxide, aluminum oxide, crosslinked polyester(s), crosslinked polystyrene, mica, talc and kaolin; a thermal decomposition inhibitor(s); thermal stabilizer(s); and antioxidant(s) may be added.

An example of the method for crosslinking/increasing molecular weight of PPS resin by heating is a method wherein the resin is heated until a desired melt viscosity is attained at a prescribed temperature in a heating vessel under an oxidative gas atmosphere such as air or oxygen, or under a mixed gas atmosphere of the above-mentioned oxidative gas and an inert gas such as nitrogen or argon. The heat treatment temperature is usually selected from the range between 170° C. and 280° C., preferably between 200° C. and 270° C., and the heat treatment time is usually selected from the range between 0.5 hours and 100 hours, preferably 2 hours and 50 hours. By controlling these, the desired viscosity level can be attained. The heat treatment apparatus may be either a usual hot air dryer or a heating apparatus of revolving type or heating apparatus equipped with stirring blades, and the heating apparatus of revolving type or heating apparatus equipped with stirring blades is preferred for the effective and uniform treatment.

An example of the method of heat treatment of PPS resin under an inert gas atmosphere such as nitrogen or under a reduced pressure is a method wherein the heat treatment is carried out under an inert gas atmosphere such as nitrogen or under a reduced pressure at a heat treatment temperature of 150° C. to 280° C., preferably 200° C. to 270° C. for a heating time of 0.5 to 100 hours, preferably 2 to 50 hours. The heat treatment apparatus may be either a usual hot air dryer or a heating apparatus of revolving type or heating apparatus equipped with stirring blades, and the heating apparatus of revolving type or heating apparatus equipped with stirring blades is preferred for the effective and uniform treatment. To attain the purpose of increasing tensile elongation at break, PPS resin is preferably a substantially linear PPS whose molecular weight was not increased by a thermal oxidative crosslinking treatment.

The PPS resin preferably contains at least PPS resin subjected to a deionization treatment. Examples of the deionization treatment include washing treatments with an aqueous acid solution, washing treatments with hot water and washing treatments with an organic solvent, and two or more of these treatments may be employed in combination.

As an example of the method of washing treatment of PPS resin with an organic solvent, the following method may be exemplified: That is, the organic solvent is not particularly limited insofar as it does not have an action of decomposing PPS resin, and examples thereof include nitrogen-containing polar solvents such as N-methylpyrrolidone, dimethyl formamide, dimethyl acetamide or the like; sulfoxide and sulfone solvents such as dimethyl sulfoxide, dimethylsulfone or the like; ketone solvents such as acetone, methyl ethyl ketone, diethyl ketone, acetophenone or the like; ether solvents such as dimethyl ether, dipropyl ether, tetrahydrofuran or the like; halogen-based solvents such as chloroform, methylene chloride, trichloroethylene, ethylene dichloride, dichloroethane, tetrachloroethane, chlorobenzene or the like; alcohol and phenol solvents such as methanol, ethanol, propanol, butanol, pentanol, ethylene glycol, propylene glycol, phenol, cresol, polyethylene glycol or the like; and aromatic hydrocarbon solvents such as benzene, toluene and xylene. Among these organic solvents, N-methylpyrrolidone, acetone, dimethyl formamide and chloroform can be particularly preferably used. These organic solvents may be used individually or two or more of them may be used in combination.

The method of washing PPS resin with an organic solvent includes a method wherein the PPS resin is immersed in an organic solvent, and stirring or heating may be employed as required. The washing temperature when the PPS resin is washed with the organic solvent is not restricted, and an arbitrary temperature may be selected from the range between normal temperature and 300° C. Although the higher the washing temperature, the higher the washing efficiency, a sufficient effect can be usually obtained at a temperature between normal temperature and 150° C. It is preferred to wash PPS resin several times with water or warmed water after washing with the organic solvent to remove the residual organic solvent.

As an example of the method of washing PPS resin with hot water, the following method may be exemplified: That is, to obtain the effect of the desired chemical modification of the PPS resin by the washing with hot water, the water used is preferably distilled water or deionized water. The operation of the treatment with hot water is usually carried out by feeding a prescribed amount of PPS resin to a prescribed amount of water, and the mixture is heated and stirred under normal pressure or in a pressurized vessel. As for the mixing ratio of the PPS resin and water, the more the water, the more preferable, and a liquor ratio of not more than 200 g of PPS resin with respect to 1 liter of water is usually selected.

As an example of the method of treating PPS resin with aqueous acid solution, the following method may be exemplified: That is, the exemplified method is a method wherein the PPS resin is immersed in an acid or an aqueous solution of an acid, and stirring or heating may be employed as required. The acid to be used is not particularly limited insofar as it does not have an action of decomposing PPS resin, and examples of such acid include aliphatic saturated monocarboxylic acids such as formic acid, acetic acid, propionic acid and butyric acid; halogen-substituted aliphatic saturated carboxylic acids such as chloroacetic acid, dichloroacetic acid or the like; aliphatic unsaturated monocarboxylic acids such as acrylic acid, crotonic acid or the like; aromatic carboxylic acids such as benzoic acid, salicylic acid or the like; dicarboxylic acids such as oxalic acid, malonic acid, succinic acid, phthalic acid, fumaric acid or the like; and inorganic acid compounds such as sulfuric acid, phosphoric acid, hydrochloric acid, carbonic acid and silicic acid. Among these compounds, acetic acid and hydrochloric acid are preferably used. Acid-treated PPS resin is preferably washed several times with water or heated water to remove a residual acid, salt or the like. In order not to adversely affect the effect of the desired chemical modification of the PPS resin by the acid treatment, the water used is preferably distilled water or deionized water. However, since the PPS resin subjected to the treatment of washing with an aqueous acid solution (hereinafter also referred to as "acid-terminated PPS resin") has a high melt crystallization temperature, the crystallization proceeds on the casting drum after melt extrusion when the film thickness is large, so that the breakage of the film may occur in the subsequent stretching step and so the film-forming stability may be deteriorated.

On the other hand, in the PPS resin subjected to a washing treatment with an aqueous calcium salt solution such as aqueous calcium acetate solution, a part of the terminal components is thought to be substituted with a Ca-terminated component (the PPS resin is hereinafter also referred to as "Ca-terminated PPS resin"). Since the Ca-terminated PPS resin and the PPS resin not washed with an acid (the PPS resin is hereinafter also referred to as "Na-terminated PPS resin") have lower melt crystallization temperature and also slower crystallization rate than the acid-terminated PPS resin, if they are used as a material in the production of a thick film, the crystallization of the polymer after the melt extrusion is inhibited, which is preferred in some cases. The PPS resin subjected to the treatment of washing with an aqueous calcium acetate solution is preferably employed from the viewpoint of film-forming stability.

Examples of the method of decreasing the oligomer components in PPS resin include a method wherein preliminary drying before melt extrusion is performed; a method wherein the above-described Ca-terminated PPS is added in a prescribed amount; and a method wherein a previous melt-kneading (pelletizing) is carried out; and the method wherein the previous kneading (pelletizing) is performed is preferred. Addition of water in the previous melt-kneading is advantageously utilized for decreasing the oligomers.

To the biaxially oriented polyarylene sulfide film, thermoplastic resin(s) other than polyarylene sulfides can be added. That is, examples of polymers other than polyarylene sulfides include, for example, various polymers such as polyamides, polyetherimides, polyethersulfones, polysulfones, polyphenylene ethers, polyesters, polyarylates, polyamideimides, polycarbonates, polyolefins, polyetheretherketones and the like, and blends containing at least one of these polymers. The thermoplastic resins preferably have a melting point or a glass transition temperature which is equal to or lower than the melting temperature of the polyarylene sulfide. For example, various polymers such as polyarylates, polyetherimides, polyethersulfones, polysulfones, polyphenylene ethers, polyamideimides, polycarbonates, polycycloolefins and the like, and blends containing at least one of these polymers may be employed.

The content of the organic or inorganic filler other than the thermoplastic resin(s), inert particles or the like is not restricted as long as the content is within our range, and is preferably not more than 20 wt % and more preferably not more than 10 wt % based on the weight of the film. The biaxially oriented polyarylene sulfide film may contain other component(s) such as a heat stabilizer, antioxidant, ultraviolet absorber, antistatic agent, flame retardant, pigment, dye, organic lubricant such as an aliphatic acid ester or wax and the like in an amount that is not adverse. To give easy lubrication, abrasion resistance, scratch resistance or the like to the film surface, inorganic particles, organic particles or the like may also be added to the biaxially oriented polyarylene sulfide film. Examples of such additives include inorganic particles such as clay, mica, titanium oxide, calcium carbonate, kaolin, talc, wet process or dry process silica, colloidal silica, calcium phosphate, barium sulfate, alumina and zirconia; organic particles containing as constituting components such as acrylates and styrene; the so called internal particles precipitated due to the catalyst added in the polymerization reaction of the polyarylene sulfide; and surfactants.

It is important that one of the elongations at break in the machine direction and in the transverse direction of the biaxially oriented polyarylene sulfide film is not lower than 110%. More preferably, one of the elongations at break in the machine direction and in the transverse direction of the film is not lower than 120%, or more preferably not lower than 130%. The film wherein the elongation at break in the machine direction or in the transverse direction of the film is within our range may be obtained by stretching the film in the machine direction and the transverse direction such that the area stretching ratio is not more than 13-times, heat-setting the film after the stretching in not less than 2 steps each at different temperatures, wherein the temperature of the heat-setting process in the first step is not lower than 160° C. and not higher than 220° C. and the temperature of the heat-setting process in the later steps is not lower than 240° C. and not higher than 280° C., and suitably adjusting a relaxation treatment at not more than 8%, preferably at 2 to 5% below the melting point of the polyarylene sulfide. When the elongation at break is less than 110%, the film may be broken in the processing or in using the film, which may not be acceptable in practice in some cases.

It is important that one of the elongation at break in the machine direction and in the transverse direction of the biaxially oriented polyarylene sulfide film is not lower than 110% and, preferably, the elongation at break in the other direction is not less than 90%, more preferably not less than 100% although not limited thereto.

Further, preferably, from the viewpoint of promoting processability, both the average elongation at break of the film in the machine direction and that in the transverse direction are not less than 110%, more preferably not less than 120%, and still more preferably not less than 130%.

The above-described elongation at break is attained by stretching and heat-setting the polyarylene sulfide resin under the film forming conditions. It is important in the film forming conditions that the film-forming stretching rate be decreased to a selected rate, but when the stretching ratio in the film formation is decreased, while the elongation at break of the film is improved, the flatness of the film deteriorates, which may not be acceptable in practice in some cases.

It is important that one of the breaking stresses in the machine direction and in the transverse direction of the biaxially oriented polyarylene sulfide film is not higher than 200 MPa. More preferably, the breaking stress is not higher than 190 MPa, and still more preferably not higher than 180 MPa. When the breaking stress is more than 200 MPa, the film may be broken in the processing or in using the film, which may not be acceptable in practice in some cases. Preferably, the breaking stress in the other direction is not restricted, and is not higher than 300 MPa, more preferably not higher than 250 MPa.

Preferably, from the viewpoint of processability, both the average breaking stress of the film in the machine direction and that in the transverse direction are not higher than 200 MPa, more preferably not higher than 190 MPa and still more preferably not higher than 180 MPa.

The elongation at break and breaking stress are measured by clamping a cut out sample with a pair of upper and lower chucks by using Instron type tensile strength tester, which sample was set such that the measurement direction is coincide with the tensile direction; carrying out the tensile test; and measuring the elongation and the stress when the film sample was broken as the elongation at break and the breaking stress respectively. That is, the breaking stress was measured in accordance with the method defined in ASTM-D882, for each sample having a width of 10 mm, a length of 150 mm and a gauge length of 100 mm at a tensile rate of 300 mm/min at room temperature using Instron type tensile strength tester. Ten samples are subjected to the measurement, and the averages are defined as the elongation at break and the breaking stress.

It is important that both the heat shrinkage ratio of the biaxially oriented polyarylene sulfide film in the machine direction and that in the transverse direction which film is heated at 260° C. for 10 minutes (hereinafter described as "at 260° C. for 10 minutes") are not less than 0% and not more than 10%. More preferably, both of the heat shrinkage ratios are not less than 0% and not more than 8%. When the heat shrinkage ratio at 260° C. for 10 minutes is less than 0%, the film cannot be contracted sufficiently in the relaxation treatment after the film formation and heat-setting, so that the film slacks in the tenter oven and contacts with a thermal insulation plate to break or deteriorate with the flatness of the film. When the heat shrinkage ratio of the film is higher than 10%, the film thermally contracts greatly under the atmosphere in heating, which may not be acceptable in practice in some cases.

From the viewpoint of the flatness of the film, both the heat shrinkage ratio of the film in the machine direction and that in the transverse direction are preferably not lower than 0% and not higher than 10%. More preferably, the rates are not lower than 0% and not higher than 8%.

To promote the elongation at break of the biaxially oriented polyarylene sulfide film, the film forming area stretching ratio required to be decreased to a selected range. However, when the film forming area stretching ratio is decreased while keeping the conventional film-forming conditions, the flatness of the film deteriorates in some cases. We promote the elongation at break while maintaining the flatness of the film by using the two-stage heat-setting. As for the flatness of the film, it is important that the heat shrinkage ratio of the film in the transverse direction at 260° C. for 10 minutes is not lower than 0%. More preferably, when the heat shrinkage ratio of the film in the transverse direction at 250° C. for 10 minutes is not lower than 0%, the flatness is good.

The biaxially oriented polyarylene sulfide film preferably has a small endothermic peak just below the melting point, which endothermic peak is at a temperature not lower than 250° C., more preferably at a temperature not lower than 255° C., still more preferably at a temperature not lower than 260° C. When the small endothermic peak just below the melting point of the film is at a temperature lower than 250° C., the property of the polyarylene sulfide, that is, heat resistance deteriorates in some cases. For example, when the film is used at a temperature from 200° C. to 240° C., the flatness of the film may be deteriorate due to the thermal contraction of the film during the heating process.

The small endothermic peak immediately below the melting point is the small endothermic peak emerging before the melting of the crystal in the differential scanning calorimetry (DSC), which is observed at the temperature corresponding to the heat treatment temperature of the film, and which is generated due to the melting of the regions having incomplete structure in the crystal structure formed by the heat treatment.

The small endothermic peak immediately below the melting point is within our range when a tenter heat setting in the film formation is performed at a heat set temperature of not lower than 250° C. for not less than 5 seconds of a heat-set time.

From the viewpoint of promoting the heat resistance of the film, heat-setting is preferably performed at a temperature not lower than 250° C., more preferably not lower than 260° C. From the viewpoint of promoting the flatness of the film, preferably, the heat shrinkage ratio at 250° C. is set within our range.

The flatness of the film is observed as follows:

The film having a width of, for example, 50 cm although the width of the film is not restricted thereto and having a length of 1 m is fixed onto two parallel bars. The two parallel bars are placed at a height of 1 m from the ground at 1 m intervals and the ends of the sample film are fixed onto the bars. The tension of the film is not particularly restricted. The film is illuminated at 500 lux by fluorescent lamps placed immediately above the center of the film parallel to the two parallel bars. An observer stands at the center of the either of the two parallel bars, and observes the film in the machine direction and in the transverse direction respectively thereby observing slacks or creases (portion where the flatness of the film is locally broken) having a shape of an ellipse or a circle the length of whose minor axis is not less than 5 cm. The film is observed 50 m along the machine direction of the sample film to judge the film to be not good when the number of portions where a circle-shaped slack or crease occurs is not less than 20.

Oriented layers comprising a polyarylene sulfide resin (B) in which at least one meta-arylene sulfide unit other than para-arylene sulfide unit is copolymerized may be laminated on at least one side of the above-described biaxially oriented polyarylene sulfide film. The polyarylene sulfide resin (B) is preferably comprised of, as a main component, para-arylene sulfide unit which is not less than 80 mol % and not more than 92 mol % of the whole repeating unit. When the main component is less than 80 mol %, the heat resistance of the film deteriorates largely in some cases. When the main component is more than 92 mol %, the thermal adhesiveness of the film deteriorates in some cases.

Examples of copolymerization units include meta-arylene sulfide units represented by the following formulae:

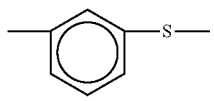

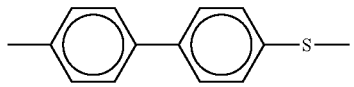

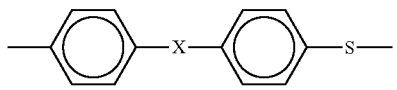

wherein X represents alkylene, CO or SO$_2$

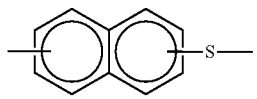 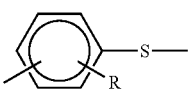

wherein R represents alkyl group, nitro group, phenylene group or alkoxy group. A complex of these units may exist. A preferable copolymerization unit is m-phenylene sulfide unit. The amount of copolymerization of these units is preferably not less than 8 mol % and not more than 18 mol %, and more preferably not less than 10 mol % and not more than 18 mol %. When the amount of the copolymerization component is less than 8 mol %, the thermal adhesiveness may not be increased sufficiently. When the amount of the copolymerization component is more than 20 mol %, the heat resistance of the oriented layer deteriorates in some cases.

Copolymerization between the above-described component and copolymerization component in the meta-arylene sulfide is not particularly restricted, but is preferably in the form of random copolymers.

The remaining part of the repeating unit of the copolymer constituting the meta-arylene sulfide may be constituted by still another copolymerizable constituting unit. For example, a tri-functional phenyl sulfide represented by the following formula is preferably contained not more than 1 mol % based on the whole copolymer:

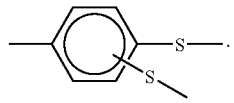

The melting point of the polyarylene sulfide resin (B) with which the meta-arylene sulfide unit is copolymerized is preferably 1 to 100° C. below, more preferably 10 to 50° C. below and still more preferably 20 to 40° C. below the melting point of the biaxially oriented polyarylene sulfide film. When the difference between the melting point of the polyarylene sulfide resin (B) with which the meta-arylene sulfide unit is copolymerized and the melting point of the biaxially oriented polyarylene sulfide film is less than 1° C., the thermal adhesiveness of the film is not sufficiently increased in some cases. When the difference between the melting point of the polyarylene sulfide resin (B) with which the meta-arylene sulfide unit is copolymerized and the melting point of the biaxially oriented polyarylene sulfide film is more than 100° C., the heat resistance of the film deteriorates greatly in some cases. The melting point of the polyarylene sulfide resin (B) with which the meta-arylene sulfide unit is copolymerized may be adjusted by molar ratio of the copolymerization component(s). For example, 210° C. of the melting point of the copolymerized polyphenylene sulfide may be attained by setting the molar ratio of the copolymerization components as 20 mol %.

The above-described polyarylene sulfide resin (B) with which the meta-arylene sulfide unit is copolymerized is preferably employed by melt processing the resin into a sheet shape, biaxially stretching the sheet, and heat treating the sheet. Although the method of laminating the polyarylene sulfide resin (B) with which the meta-arylene sulfide unit is copolymerized is not restricted, the method of co-extruding with a polyarylene sulfide resin composition (A) containing as a major component para-arylene sulfide unit is preferably employed.

The thickness of the above-described copolymerized polyarylene sulfide is not restricted, but is preferably not less than 5 μm and not more than 50 μm. More preferably the thickness is not less than 10 μm and not more than 30 μm. When the thickness of the copolymerized polyarylene sulfide is less than 5 μm, the thermal adhesiveness is not sufficiently increased in some cases. When the thickness of the copolymerized polyarylene sulfide is more than 50 μm, the heat resistance deteriorates in some cases.

The orientation of the biaxially oriented polyarylene sulfide film can be measured by laser Raman spectroscopy. As used herein "orientation" means that the orientation parameter obtained by laser Raman spectroscopy is in the range of 2.0 to 8.0, more preferably 2.5 to 6.0. When the orientation parameter is more than 8.0, molecular chain orientation becomes too high and crystallization proceeds too much, whereby the film may be broken in the processing or in using the film, which may not be acceptable in practice in some cases. When the orientation parameter is less than 2.0, molecular chain orientation is not sufficient and crystallization does not proceed sufficiently, whereby the heat resistance of the structure decreased in some cases. On the other hand, in the case where copolymerized polyphenylene sulfide layers are laminated on the biaxially oriented polyarylene sulfide film, when the orientation parameter obtained by laser Raman spectroscopy is not less than 1.3, the film can be considered to be oriented.

The measuring method by the above-described laser Raman spectroscopy is not particularly restricted, but, for example, laser Raman spectrometer (PDP320 (manufactured by PHOTON Design Corporation)) may be used, and a microprobe objective lens (magnification 100×) which has near-infrared (from 1064 to 1300 nm) transmittance and an NA of 0.95, and chromatic aberration of which is corrected may be used. Cross slit: 1 mm; spot diameter: 1 μm; light source: Nd-YAG (wave length 1064 nm, output: 1 W); diffraction grating: Spectrograph 300 g/mm; slit: 100 μm; and detector: InGaAs (Roper Scientific 512) are preferably used.

The films to be used for measurement were sampled and embedded in epoxy resin, and then a cross section was made using microtome. The films were adjusted such that the cross section of the film is parallel to machine direction or transverse direction. The center point of each of the samples was set as a measurement point, and 5 samples for machine direction and transverse direction respectively were measured and calculate each average. In the measurement, detection was carried out through a polarizer arranged parallel to the polarizing direction parallel to the polarizing direction of the incident light and spectra were obtained in the polarizing direction parallel to the film surface and in the polarizing direction perpendicular to the film surface with respect to the polarizing direction of the laser beam while rotating the sample. The orientation parameter was calculated according to the following equation:

(orientation parameter)=($I1575/I740$)(parallel)/($I1575/I740$)(perpendicular)

($I1575/I740$) (parallel): in the Raman spectrum measured in the polarizing direction parallel to the film surface, Raman band intensity near 1575 cm$^{-1}$ divided by Raman band intensity near 740 cm$^{-1}$.

($I1575/I740$) (perpendicular): in the Raman spectrum measured in the polarizing direction perpendicular to the film surface, Raman band intensity near 1575 cm$^{-1}$ divided by Raman band intensity near 740 cm$^{-1}$.

Thickness of the biaxially oriented polyarylene sulfide film differs depending on the use or the like, and is preferably not less than 1 μm and not more than 500 μm, more preferably not less than 20 μm and not more than 500 μm. From the viewpoint of applying the film to a use where thin film is required and of ease of handling, the thickness is more preferably within the range between 20 μm and 300 μm, still more preferably between 20 μm and 200 μm.

The melting point of the biaxially oriented polyarylene sulfide film is preferably not lower than 250° C., more preferably not lower than 260° C., and still more preferably not lower than 280° C.

The biaxially oriented polyarylene sulfide film may be subjected to an arbitrary processing(s) such as heat treatment, molding, surface treatment, lamination, coating, printing, emboss treatment and etching, as required.

The use of the biaxially oriented polyarylene sulfide film is not restricted, and it may be used for various industrial materials as, for example, an electrical insulating material or molding material in motors, transformers, insulated cables and the like; circuit board material; step or mold releasing film or protective film in circuit or optical parts; a material in lithium ion batteries; a material in fuel cells; speaker diaphragm. More particularly, it may be suitably used as an electrical insulated material in motors of hot water supply equipment; electrical insulated material in motors of car air conditioner used in hybrid cars and the like; as a speaker diaphragm for mobile phones; and so on.

A process for producing the biaxially oriented polyarylene sulfide film will now be described, referring to an example wherein polyphenylene sulfide is used as the polyarylene sulfide to produce a biaxially oriented polyphenylene sulfide film. However, needless to say, the films are not restricted to the following description.

Polyphenylene sulfide pellets dried under vacuum at 180° C. for 3 hours are fed to an extruder whose melting section is preliminarily heated to a temperature of 300° C. to 350° C., preferably 320° C. to 340° C. Thereafter, the melted polymer through the extruder is made to pass through a filter, and the melted polymer is extruded in the form of a sheet from a T-die. The temperature of the filter section and the die is preferably set to be a temperature higher than the temperature in the melting section of the extruder by 3° C. to 20° C., more preferably by 5° C. to 15° C. The sheet is closely contacted with a cooling drum having a surface temperature of 20° C. to 70° C. to cool and solidify the sheet to obtain an unstretched film in substantially unoriented state.

Then the unstretched film is biaxially stretched to attain biaxial orientation. As the stretching method, a sequential biaxially stretching method (a stretching method wherein the stretching in one direction are combined, such as a method wherein the film is first stretched in the machine direction and then stretched in the transverse direction), simultaneous stretching method (the film is simultaneously stretched in the machine direction and transverse direction), or a method combining these methods may be employed.

The sequential biaxially stretching method wherein the stretching is performed in the machine direction and then in the transverse direction is described.

The unstretched polyphenylene sulfide film is heated with a group of heating rolls and, from the viewpoint of promoting the electrical properties, stretched in the machine direction (MD stretching) in one step or in two or more steps at a draw ratio of 3 to 4 times the original length, preferably 3.1 to 3.4 times the original length, still more preferably 3.2 to 3.3 times the original length. Stretching temperature is within the range of Tg (glass transition temperature of polyarylene sulfide) to (Tg+40)° C., and preferably (Tg+5)° C. to (Tg+30)° C. In the case of PPS, the stretching temperature is 95° C. to 135° C., more preferably 100° C. to 125° C. The film is then cooled with a group of cooling rolls at 20° C. to 50° C.

As the method for stretching in the transverse direction (TD direction) after the MD stretching, a method using a tenter, for example, is usually employed. The both edges of the film are clamped with clips and the film is introduced into a tenter to carry out the stretching in the transverse direction (TD stretching). The stretching temperature is preferably within the range of Tg (glass transition temperature of PPS) to (Tg+40)° C., and preferably (Tg+5) to (Tg+30)° C. In the case of the PPS, the stretching temperature is 95° C. to 135° C., more preferably 100° C. to 125° C. From the viewpoint of promoting the elongation at break, the stretching ratio is within the range of 3 to 4, preferably 3.1 to 3.6 and still more preferably 3.2 to 3.5. Further, the area stretching ratio (the product of the stretching ratio in the MD direction and the stretching ratio in the TD direction) is preferably not less than 9 and not more than 13, and more preferably not less than 9.6 and not more than 12. In the case of stretching in which the area stretching ratio is more than 13, the elongation at break of the film is less than 110%, which is not preferable in some cases. When the area stretching ratio is less than 9, the flatness of the film deteriorates in some cases.

Then, the stretched film is heat-set under tension. Preferable heat-set temperature in the case of one-stage heat-setting is 250 to 280° C. When the thickness of the biaxially oriented polyphenylene sulfide is less than 50 μm, the total time of the heat-setting process and relaxation process is 1 to 10 seconds, preferably 3 to 8 seconds. When the thickness of the biaxially oriented polyphenylene sulfide is more than 50 μm, the total time of the heat-setting process and relaxation process is 5 to 60 seconds, preferably 10 to 30 seconds. Preferable heat treatment is a multiple step heat setting. In this case, the heat-set temperature of the first step is 160 to 220° C., preferably 180 to 220° C. When the thickness of the biaxially oriented polyphenylene sulfide is less than 50 μm, the treatment time is preferably 1 to 15 seconds, more preferably 1 to 8 seconds. When the thickness of the biaxially oriented polyphenylene sulfide is not less than 50 μm, the treatment time of the heat-set in the first step is preferably 1 to 15 seconds, more preferably 1 to 8 seconds. The maximum heat-set temperature in the later steps is 250 to 280° C., preferably 260 to 280° C. This film is then subjected to the relaxation treatment in transverse direction at 250 to 280° C., preferably at 260 to 280° C. The relax ratio is preferably 0.1% to 8%, more preferably within the range of 2% to 5%. The total time of the heat-setting process and the relaxation treatment process in the later steps at not less than 250° C. is preferably 1 to 15 seconds, more preferably 2 to 10 seconds when the thickness of the biaxially oriented polyphenylene sulfide is less than 50 μm. When the thickness of the biaxially oriented polyphenylene sulfide is not less than 50 μm, the total time of the heat-setting process and the relaxation treatment process in the later steps at not less than 250° C. is preferably 1 to 30 seconds, more preferably 5 to 20 seconds.

Then the film is cooled to room temperature and wound while, if necessary, carrying out the relaxing treatment in the machine direction and transverse direction to obtain the desired biaxially oriented polyarylene sulfide film.

The methods for measuring characteristics and for evaluation are as follows.

(1) Breaking Strength, Elongation at Break

These were measured by the method in accordance with ASTM-D882 using Instron type tensile strength tester. The measurement was carried out under the following conditions for 10 samples, and the average thereof was employed.

Measuring Apparatus: automatic film strength and elongation measuring apparatus "Tensilon AMF/RTA-100" produced by Orientec, Inc.
    Sample Size: width 10 mm×length 150 mm
    Gauge Length: 100 mm
    Tensile Rate: 300 mm/min.
    Measuring Environment: 23° C.

(2) Glass Transition Temperature of Resin

The temperature was measured in accordance with JIS K7121-1987. Using as the differential scanning calorimeter, DSC(RDC220) produced by Seiko Instruments Inc., and using as a data processing apparatus, Disc Station (SSC/5200) produced by the same company, 5 mg of a sample was kept at 350° C. for 5 minutes under melted condition, quickly cooled to solidify and heated from room temperature at a heating rate of 20° C./min. on a receiving plate made of aluminum. The glass transition temperature (Tg) was calculated according to the following equation:

Glass Transition Temperature=(Extrapolated Temperature at which Glass Transition Starts+Extrapolated Temperature at which Glass Transition Terminate)/2

(3) Melting Temperature of Resin

In the same manner as described in the item (2) above, in accordance with JIS K7121-1987, using as the differential scanning calorimeter, DSC(RDC220) produced by Seiko Instruments Inc., and using as a data processing apparatus, Disc Station (SSC/5200) produced by the same company, 5 mg of a sample was heated from room temperature to 340° C. at a heating rate of 20° C./min, kept at 340° C. for 5 minutes under melted condition, quickly cooled to solidify, kept for 5 minutes and then heated from room temperature at a heating rate of 20° C./min on a receiving plate made of aluminum. The peak temperature of the endothermic peak due to melting observed therein was defined as the melting temperature (Tm).

(4) Small Endothermic Peak Just Below Melting Point

In the same manner as described in the item (2) above, in accordance with JIS K7121-1987, using as the differential scanning calorimeter, DSC(RDC220) produced by Seiko Instruments Inc., and using as a data processing apparatus, Disc Station (SSC/5200) produced by the same company, 5 mg of a sample was heated from room temperature to 340° C. at a heating rate of 20° C./min. The peak temperature of the endothermic peak due to melting having a heat of fusion of the crystal of not less than 30 J/g was defined as the melting temperature (Tm), and the small endothermic peak just below Tm was defined as Tmeta.

(5) Heat Shrinkage Ratio

The film was subjected to a heat treatment in a hot air oven heated at 250° C. or 260° C. and the heat shrinkage ratio was calculated according to the following formula. In size measurement, by using Profile projector model V-16A manufactured by Nikon Co., the size of the film was read to the place of 1/1000 mm and the digit at the 1/100 mm was rounded to determine a digit at the place of 1/10 mm.

Sample Size: width 10 mm×length 150 mm
    Gauge Length: 100 mm
    Heat Treatment Temperature: 250° C. or 260° C.
    Heat Treatment Time: 10 minutes
    Sample Condition: No Tension
    Heat Shrinkage Ratio (%)={(Size Before Heat Treatment)−(Size After Heat Treatment)}/(Size Before Heat Treatment)×100

(6) Melt Viscosity

Using Flow Tester CFT-500 (manufactured by Shimadzu Corporation), measurement was carried out with a die of 10 mm in length, a die diameter of 1.0 mm, preheating time of 5 minutes and a temperature of 310° C.

The melt viscosity at a shear rate of 1000/s was calculating from the melt viscosity at a shear rate of 500 to 1000/s and the melt viscosity at a shear rate of 1000 to 2000/s. The measurement of the melt viscosity was carried out two times each. The value at a shear rate of 1000/s was determined by estimating at 1000/s from linear approximated correlation line of log-log plot of the measurement result.

(7) Flatness

The flatness of the film was observed as follows:

The film having a width of 50 cm and a length of 1 m was fixed onto two parallel bars which were placed at a height of 1 m from the ground at 1 m intervals and the ends of the sample film are fixed onto the bars. The fixation of the film was carried out by applying a commercially available adhesive tape in the film transverse direction. An observer stood at the center of the either of the two parallel bars. The film was illuminated at 500 lux by fluorescent lamps placed immediately above the center of the film parallel to the two parallel bars. The film was observed in the machine direction and in the transverse direction respectively whereby slacks or creases (portion where the flatness of the film is locally broken) having a shape of an ellipse or a circle the length of whose minor axis was not less than 5 cm was observed. The existence of the slacks or creases was observed 50 m along the machine direction of the sample film to judge the film according to the following criteria.

○: The number of slacks or creases occurred is 0 to less than 10

Δ: The number of slacks or creases occurred is 10 to less than 20 x: The number of slacks or creases occurred is not less than 20

EXAMPLES

Reference Example 1

Polymerization of PPS Resin

Into a 70 L autoclave provided with a stirrer, 8,267.37 g of 47.5% sodium hydrosulfide (70.00 moles), 2,957.21 g of 96% Sodium hydroxide (70.97 moles), 11,434.50 g of N-methyl-2-pyrrolidone (NMP) (115.50 moles), 2,583.00 g of sodium acetate (31.50 moles) and 10,500 g of ion-exchanged water were added. The resulting mixture was then slowly heated to 245° C. for about 3 hours under atmospheric pressure under nitrogen gas flow, thereby distilling 14,780.1 g of water and 280 g of NMP, and the reaction vessel was cooled to 160° C. The residual amount of water in the system per 1 mole of the supplied alkali metal sulfide was 1.06 moles including the water consumed for hydrolysis of NMP. The amount of hydrogen sulfide scattered was 0.02 mole per 1 mole of the supplied alkali metal sulfide.

Subsequently, 10,235.46 g (69.63 moles) of p-dichlorobenzene and 9,009.00 g (91.00 moles) of NMP were added, and the reaction vessel was hermetically sealed under nitrogen gas. The mixture was heated to 238° C. at a rate of 0.6° C./min. under stirring at 240 rpm. After reacting at 238° C. for 95 minutes, it was heated to 270° C. at a rate of 0.8° C./min. After reacting at 270° C. for 100 minutes, it was cooled to 250° C. at a rate of 1.3° C./min while injecting 1,260 g (70 moles) of water thereto for 15 minutes. The mixture was then cooled to 200° C. at a rate of 1.0° C./min. and was subsequently cooled rapidly to about room temperature.

After removal of the content and dilution thereof with 26,300 g of NMP, the solids were separated from the solvent by filtration with a screen (80-mesh), and the obtained particles were washed with 31,900 g of NMP, followed by removal by filtration. After several times of washing with 56,000 g of ion-exchanged water and removal by filtration, the particles were washed with 70,000 g of 0.05% by weight of aqueous acetic acid solution and were removed by filtration. The particles were then washed with 70,000 g of ion-exchanged water and were removed by filtration, followed by hot-air drying of the resulting hydrated PPS particles at 80° C. and the subsequent drying thereof under reduced pressure at 120° C. The obtained PPS resin showed a melt viscosity of 2000 poise (310° C., with a shear rate of 1,000/s), a glass transition temperature of 90° C. and a melting point of 280° C.

Reference Example 2

Polymerization of Copolymerized Polyphenylene Sulfide Resin

Into an autoclave, 100 moles of sodium sulfide nonahydrate, 45 moles of sodium acetate and 25 liters of N-methyl-2-pyrrolidone (hereinafter referred to as NMP for short) were added. The mixture was slowly heated with stirring to a temperature of 220° C. to remove the contained water by distillation. Into the dried system, 91 moles of p-dichlorobenzene as a main component monomer, 10 moles of m-dichlorobenzene and 0.2 mole of 1,2,4-trichlorobenzene as accessory components were added together with 5 liters of NMP. After nitrogen was contained under pressure at 3 kg/cm² at a temperature of 170° C., the system was heated and polymerization was carried out at a temperature of 260° C. for 4 hours. After the polymerization was stopped, the resultant was cooled. A polymer was precipitated in distilled water and a small mass of polymer was picked by a 150 mesh wire net. After the thus obtained small mass of polymer was washed 5 times with distilled water at 90° C., the polymer was dried under reduced pressure at a temperature of 120° C. to thereby obtain a copolymerized polyphenylene sulfide resin having a melt viscosity of 1000 poise and a melting point of 255° C. Subsequently, 0.3% by weight of calcium carbonate powder having an average particle diameter of 1.2 μm were added to be dispersed uniformly and blended. The resultant was extruded by a 30 mmφ biaxial extruder at a temperature of 320° C. into a gut shape to obtain copolymerized polyphenylene sulfide pellets.

Example 1

After blending 100 parts by weight of PPS resin prepared in Reference Example 1 and 0.3 parts by weight of calcium carbonate powder having an average particle diameter of 1.2 μm, and drying under reduced pressure at 180° C. for 3 hours, the resultant was supplied to a full flight uniaxial extruder whose melting section was heated to 320° C. The polymer melted in the extruder was filtered with a filter which was set to a temperature of 330° C. and was melt-extruded from a T-die which was set to a temperature of 310° C. The resulting polymer was cooled and solidified by close contact with the casting drum whose surface temperature was 25° C. and to which static electricity was kept applied, to produce an unstretched film.

This unstretched film was stretched after preheating at a temperature of 101° C. in the longitudinal direction of the film at a ratio of 3.3 using a longitudinal stretching machine comprising multiple heated rolls, utilizing the difference in peripheral speed among the rolls. The both sides of this film were then held with clips, and the film was guided to a tenter and was stretched in the transverse direction at a drawing temperature of 101° C. at a draw ratio of 3.5, followed by heat-treatment at 200° C. for 4 seconds (the first step heat treatment) then heat-treatment at 260° C. for 4 seconds (the second step heat treatment). Subsequently, after the film was subjected to 5% relaxation treatment in the lateral direction for 4 seconds in a relaxation treatment zone at 260° C., the film was cooled to room temperature, followed by removal of the film edges to produce a biaxially oriented PPS film having a thickness of 25 μm.

The results of measurement and evaluation of the constitution and characteristics of the obtained biaxially oriented PPS film are as shown in Table 1, demonstrating that this biaxially oriented PPS film showed increased elongation at break and excellent flatness.

Example 2

A biaxially oriented PPS film was produced in the same manner as in Example 1 except that the stretching ratio was 3.4 in longitudinal direction and 3.5 in transverse direction, and that the second step heat-set temperature was 270° C.

The results of measurement and evaluation of the constitution and characteristics of the obtained biaxially oriented PPS film are as shown in Table 1, demonstrating that this biaxially oriented PPS film showed increased elongation at break and excellent flatness.

Example 3

A biaxially oriented PPS film was produced in the same manner as in Example 1 except that the stretching ratio was 3.5 in longitudinal direction and 3.6 in transverse direction, and that the second step heat-set temperature was 270° C.

The results of measurement and evaluation of the constitution and characteristics of the obtained biaxially oriented PPS film are as shown in Table 1, demonstrating that this biaxially oriented PPS film showed increased elongation at break and excellent flatness.

Example 4

A biaxially oriented PPS film was produced in the same manner as in Example 1 except that the first step heat-set time was 6 seconds, the second heat-set time was 6 seconds and the relaxation treatment time was 6 seconds.

The results of measurement and evaluation of the constitution and characteristics of the obtained biaxially oriented PPS film are as shown in Table 1, demonstrating that this biaxially oriented PPS film showed increased elongation at break and deterioration of flatness.

Example 5

A biaxially oriented PPS film was produced in the same manner as in Example 1 except that the first step heat-set temperature was 260° C., the heat-set time was 2 seconds, the second step heat-set time was 2 seconds and the relaxation treatment time was 2 seconds.

The results of measurement and evaluation of the constitution and characteristics of the obtained biaxially oriented PPS film are as shown in Table 1, demonstrating that this biaxially oriented PPS film showed increased elongation at break and deterioration of flatness.

Example 6

A biaxially oriented PPS film was produced in the same manner as in Example 2 except that the stretching ratio was 3.4 in longitudinal direction and 3.7 in transverse direction. The results of measurement and evaluation of the constitution and characteristics of the obtained biaxially oriented PPS film are as shown in Table 1, demonstrating that this biaxially oriented PPS film showed increased elongation at break and excellent flatness.

Example 7

In the method of Example 1, a film was stretched at a draw ratio of 3.7 in longitudinal direction and at a draw ratio of 3.5 in transverse direction, followed by heat-treatment at 200° C. for 8 seconds (the first step heat treatment) then heat-treatment at 260° C. for 8 seconds (the second step heat treatment). Subsequently, after the film was subjected to 5% relaxation treatment in transverse direction for 8 seconds in the relaxation treatment zone at 260° C., the film was cooled to room temperature, followed by removal of the film edges to produce a biaxially oriented PPS film having a thickness of 50 μm. The results of measurement and evaluation of the constitution and characteristics of the obtained biaxially oriented PPS film are as shown in Table 1, demonstrating that this biaxially oriented PPS film showed increased elongation at break and excellent flatness.

Example 8

A biaxially oriented PPS film was produced in the same manner as in Example 7 except that the first step heat-set time was 12 seconds, the second step heat-set time was 12 seconds and the relaxation treatment time was 12 seconds.

The results of measurement and evaluation of the constitution and characteristics of the obtained biaxially oriented PPS film are as shown in Table 1, demonstrating that this biaxially oriented PPS film showed increased elongation at break and deterioration of flatness.

Example 9

A biaxially oriented PPS film was produced in the same manner as in Example 7 except that thickness of the biaxially oriented PPS film was 75 μm. The results of measurement and evaluation of the constitution and characteristics of the obtained biaxially oriented PPS film are as shown in Table 1, demonstrating that this biaxially oriented PPS film showed increased elongation at break and excellent flatness.

Example 10

A biaxially oriented PPS film was produced in the same manner as in Example 9 except that the first step heat-set time was 12 seconds, the second step heat-set time was 12 seconds and the relaxation treatment time was 12 seconds.

The results of measurement and evaluation of the constitution and characteristics of the obtained biaxially oriented PPS film are as shown in Table 1, demonstrating that this biaxially oriented PPS film showed increased elongation at break and deterioration of flatness.

Example 11

The PPS resin and the copolymerized polyphenylene sulfide resin obtained in Reference Example (1) and (2) were fed to separate extruders after drying under reduced pressure of 1 mmHg at a temperature of 180° C. for 3 hours, and the resins in a melted condition were guided by using a double tube structure laminating apparatus located above a die into 2 layers. The resins were then discharged from a T-die and quickly cooled on a cooling drum having a temperature of 25° C. to obtain a copolymerized polyphenylene sulfide/PPS 2-layer laminate sheet. Subsequently, each of the obtained laminate sheets was conveyed contacting with a plurality of heated rolls having a surface temperature of 95° C. to be stretched at a ratio of 3.7 in tmachine direction between cooling rolls having a temperature of 30° C. with different peripheral speeds provided next to the heated rolls. The both sides of this film were then held with clips, and the film was guided to a tenter and was stretched in transverse direction at a drawing temperature of 101° C. at a draw ratio of 3.5. Subsequently, heat-treatment at 200° C. for 8 seconds (the first step heat treatment) then heat-treatment at 260° C. for 8 seconds (the second step heat treatment) were carried out. Subsequently, after the film was subjected to 5% relaxation treatment in transverse direction for 8 seconds in a relaxation treatment zone at 260° C., the film was cooled to room temperature, followed by removal of the film edges to produce a copolymerized polyphenylene sulfide/PPS (10/65 μm) biaxially oriented PPS film. The results of measurement and evaluation of the constitution and characteristics of the obtained biaxially oriented PPS film are as shown in Table 1, demonstrating that this biaxially oriented PPS film showed increased elongation at break and excellent flatness.

Example 12

A biaxially oriented PPS film was produced in the same manner as in Example 9 except that 90 parts by weight of the PPS resin obtained in Reference Example (1) and 10 parts by weight of the copolymerized polyphenylene sulfide resin were employed. The results of measurement and evaluation of the constitution and characteristics of the obtained biaxially oriented PPS film are as shown in Table 1, demonstrating that this biaxially oriented PPS film showed increased elongation at break and excellent flatness.

Comparative Example 1

A biaxially oriented PPS film was produced in the same manner as in Example 1 except that the stretching ratio was 3.7 in longitudinal direction and 3.6 in transverse direction.

The results of measurement and evaluation of the constitution and characteristics of the obtained biaxially oriented PPS film are as shown in Table 1, demonstrating that this biaxially oriented PPS film showed insufficient elongation at break.

Comparative Example 2

A biaxially oriented PPS film was produced in the same manner as in Example 2 except that the first step heat-set time was 8 seconds, the second step heat-set time was 8 seconds and the relaxation treatment time was 8 seconds.

The results of measurement and evaluation of the constitution and characteristics of the obtained biaxially oriented PPS film are as shown in Table 1, demonstrating that this biaxially oriented PPS film showed insufficient flatness.

Comparative Example 3

A biaxially oriented PPS film was produced in the same manner as in Example 1 except that the first step heat-set temperature was 260° C.

The results of measurement and evaluation of the constitution and characteristics of the obtained biaxially oriented PPS film are as shown in Table 1, demonstrating that this biaxially oriented PPS film showed insufficient flatness.

Comparative Example 4

A biaxially oriented PPS film was produced in the same manner as in Example 6 except that the first step heat-set temperature was 260° C.

The results of measurement and evaluation of the constitution and characteristics of the obtained biaxially oriented PPS film are as shown in Table 1, demonstrating that this biaxially oriented PPS film showed insufficient flatness.

Comparative Example 5

A biaxially oriented PPS film was produced in the same manner as in Example 8 except that the first step heat-set temperature was 260° C.

The results of measurement and evaluation of the constitution and characteristics of the obtained biaxially oriented PPS film are as shown in Table 1, demonstrating that this biaxially oriented PPS film showed insufficient flatness.

Comparative Example 6

A biaxially oriented PPS film was produced in the same manner as in Example 10 except that the first step heat-set temperature was 260° C.

The results of measurement and evaluation of the constitution and characteristics of the obtained biaxially oriented PPS film are as shown in Table 1, demonstrating that this biaxially oriented PPS film showed insufficient flatness.

Comparative Example 7

A biaxially oriented PPS film was produced in the same manner as in Example 12 except that the stretching ratio was 3.0 in the longitudinal direction and 3.0 in the lateral direction, the first step heat-set temperature was 250° C., the heat-set time was 4 seconds, the second step heat-set temperature was 250° C., the heat-set time was 4 seconds, the relaxation treatment temperature was 250° C., the relaxation treatment time was 4 seconds and the thickness was 25 μm.

The results of measurement and evaluation of the constitution and characteristics of the obtained biaxially oriented PPS film are as shown in Table 1, demonstrating that this biaxially oriented PPS film showed increased heat shrinkage ratio at 260° C., increased elongation at break and deterioration of flatness.

TABLE 1

| | Film Formation | | | | | | | | | |
|---|---|---|---|---|---|---|---|---|---|---|
| | Stretching Ratio (Times) MD/TD | Thickness (μm) | Area stretching ratio (times) | First step heat-set temperature (° C.) | First step heat-set time (seconds) | Second step heat-set temperature (° C.) | Second step heat-set time (seconds) | Relaxation Treatment Temperature (° C.) | Relaxation Treatment Time (seconds) | Relaxation Treatment (%) |
| Example 1 | 3.3/3.5 | 25 | 11.55 | 200 | 4 | 260 | 4 | 260 | 4 | 5 |
| Example 2 | 3.4/3.5 | 25 | 11.9 | 200 | 4 | 270 | 4 | 260 | 4 | 5 |
| Example 3 | 3.5/3.6 | 25 | 12.6 | 200 | 4 | 270 | 4 | 260 | 4 | 5 |
| Example 4 | 3.3/3.5 | 25 | 11.55 | 200 | 6 | 260 | 6 | 260 | 6 | 5 |
| Example 5 | 3.3/3.5 | 25 | 11.55 | 260 | 2 | 260 | 2 | 260 | 2 | 5 |
| Example 6 | 3.4/3.7 | 25 | 12.58 | 200 | 4 | 270 | 4 | 260 | 4 | 5 |
| Example 7 | 3.7/3.5 | 50 | 12.95 | 200 | 8 | 260 | 8 | 260 | 8 | 5 |
| Example 8 | 3.7/3.5 | 50 | 12.95 | 200 | 12 | 260 | 12 | 260 | 12 | 5 |
| Example 9 | 3.7/3.5 | 75 | 12.95 | 200 | 8 | 260 | 8 | 260 | 8 | 5 |
| Example 10 | 3.7/3.5 | 75 | 12.95 | 200 | 12 | 260 | 12 | 260 | 12 | 5 |
| Example 11 | 3.7/3.5 | 10/65 | 12.95 | 200 | 8 | 260 | 8 | 260 | 8 | 5 |
| Example 12 | 3.7/3.5 | 75 | 12.95 | 200 | 8 | 260 | 8 | 260 | 8 | 5 |
| Comparative Example 1 | 3.7/3.6 | 25 | 13.32 | 200 | 4 | 260 | 4 | 260 | 4 | 5 |
| Comparative Example 2 | 3.4/3.5 | 25 | 11.9 | 200 | 8 | 270 | 8 | 260 | 8 | 5 |
| Comparative Example 3 | 3.3/3.5 | 25 | 11.55 | 260 | 4 | 260 | 4 | 260 | 4 | 5 |

TABLE 1-continued

| | | | | | | | | | | |
|---|---|---|---|---|---|---|---|---|---|---|
| Comparative Example 4 | 3.7/3.5 | 50 | 12.95 | 260 | 8 | 260 | 8 | 260 | 8 | 5 |
| Comparative Example 5 | 3.7/3.5 | 75 | 12.95 | 260 | 8 | 260 | 8 | 260 | 8 | 5 |
| Comparative Example 6 | 3.7/3.5 | 10/65 | 12.95 | 260 | 8 | 260 | 8 | 260 | 8 | 5 |
| Comparative Example 7 | 3.0/3.0 | 25 | 9 | 250 | 4 | 250 | 4 | 250 | 4 | 5 |

| | Film Properties | | | | | |
|---|---|---|---|---|---|---|
| | Elongation at Break (%) MD/TD | Breaking Strength (MPa) MD/TD | Small Endothermic Peak Just Below The Melting Point (°C.) | Heat Shrinkage Ratio at 250° C. for 10 min. (%) MD/TD | Heat Shrinkage Ratio at 260° C. for 10 min. (%) MD/TD | Flatness |
| Example 1 | 140/130 | 160/170 | 255 | 4.5/0.1 | 5/0.2 | ○ |
| Example 2 | 125/115 | 180/185 | 265 | 4.0/0.1 | 4.5/0.2 | ○ |
| Example 3 | 115/108 | 190/200 | 265 | 4.3/0.1 | 4.8/0.3 | ○ |
| Example 4 | 140/130 | 160/170 | 255 | 4.5/−0.1 | 5/0.1 | Δ |
| Example 5 | 140/130 | 160/170 | 255 | 4.0/−0.1 | 4.5/0.1 | Δ |
| Example 6 | 115/95 | 185/210 | 265 | 4.5/0.2 | 4.7/0.5 | Δ |
| Example 7 | 120/125 | 230/175 | 255 | 5.5/0.1 | 6/0.2 | ○ |
| Example 8 | 115/120 | 220/170 | 255 | 5/−0.2 | 5.5/0.1 | Δ |
| Example 9 | 115/120 | 210/170 | 255 | 5/0.1 | 5.5/0.2 | ○ |
| Example 10 | 110/115 | 200/160 | 255 | 4.5/−0.2 | 5/0.1 | Δ |
| Example 11 | 120/125 | 200/165 | 255 | 4.7/0.1 | 5.3/0.2 | ○ |
| Example 12 | 115/120 | 210/170 | 255 | 5/0.1 | 5.5/0.2 | ○ |
| Comparative Example 1 | 90/95 | 210/230 | 255 | 6/−0.1 | 6.5/0.5 | ○ |
| Comparative Example 2 | 120/110 | 185/190 | 265 | 4.5/−0.3 | 5/−0.2 | x |
| Comparative Example 3 | 135/125 | 170/175 | 255 | 4.5/−0.3 | 4.8/−0.2 | x |
| Comparative Example 4 | 115/120 | 220/180 | 255 | 5.0/−0.3 | 5.5/−0.2 | x |
| Comparative Example 5 | 110/115 | 190/175 | 255 | 4.5/−0.3 | 5.0/−0.2 | x |
| Comparative Example 6 | 115/120 | 175/170 | 255 | 4.5/−0.2 | 4.8/−0.3 | x |
| Comparative Example 7 | 120/130 | 160/150 | 245 | 7/−0.1 | 12/2.0 | x |

INDUSTRIAL APPLICABILITY

The biaxially oriented polyarylene sulfide film has a greatly improved elongation at break, and it may be suitably used for various industrial materials as, for example, an electrical insulating material in motors, transformers, insulative cables and the like; molding material; circuit board material; step or mold releasing in circuit or optical parts; a material in lithium ion batteries; a material in fuel cells; speaker diaphragm; or the like.

The invention claimed is:

1. A biaxially oriented polyarylene sulfide film composed of polyarylene sulfide resin (A) comprising polyarylene sulfide resin in an amount of not less than 95.5 wt % excluding inorganic components, wherein one of the elongations at break in the machine direction and in the transverse direction of the film is not lower than 110%; one of the breaking stresses in the machine direction and in the transverse direction of the film is not higher than 200 MPa; and both of the heat shrinkage ratio in the machine direction of the film and that in the transverse direction of the film at 250° C. for 10 minutes are not less than 0% and not more than 10%, wherein a small endothermic peak immediately below the melting point in DSC of the film is not less than 250° C.

2. The biaxially oriented polyarylene sulfide film according to claim 1, wherein both of the heat shrinkage ratio in the machine direction of the film and that in the trans-verse direction of the film at 250° C. for 10 minutes are not less than 0% and not more than 10%.

3. A biaxially oriented polyarylene sulfide film, "comprising polyarylene sulfide resin in an amount of not less than 99.5 wt % excluding inorganic components" wherein both of the average elongation at break in the machine direction of the film and that in the transverse direction of the film are not lower than 110%; both of the average breaking stress in the machine direction of the film and that in the transverse direction of the film are not higher than 200 MPa; and both of the heat shrinkage ratio in the machine direction of the film and that in the transverse direction of the film at 260° C. for 10 minutes are not less than 0% and not more than 10%.

4. The biaxially oriented polyarylene sulfide film according to claim 3, wherein both the elongation at break in the machine direction of the film and that in the trans-verse direction of the film are not lower than 120%.

5. The biaxially oriented polyarylene sulfide film according to claim 1, which film has a layer comprising a polyarylene sulfide resin (B) in which at least one meta-arylene sulfide other than para-arylene sulfide is copolymerized on at least one side of the biaxially oriented polyarylene sulfide film.

6. The biaxially oriented polyarylene sulfide film according to claim 1, wherein the polyarylene sulfide is polyphenylene sulfide.

7. A method for producing a biaxially oriented polyarylene sulfide film according to claim 1, comprising stretching the film in the machine direction and the transverse direction such that the area stretching ratio is not more than 13-times and heat-setting the film after the stretching in not less than 2 steps each at different temperatures, wherein the heat-setting temperature in the first heat-setting step is not lower than 160° C. and not higher than 220° C. and the maximum heat-setting temperature in the second heat-setting step is not lower than 240° C. and not higher than 280° C.

8. The method for producing a biaxially oriented polyarylene sulfide film according to claim 7, wherein the total time of the heat-setting process at not less than 240° C. and a relaxation process of the biaxially oriented polyarylene sulfide film having a thickness of not less than 50 μm is not more than 1 second and not more than 30 seconds.

9. The method for producing a biaxially oriented polyarylene sulfide film according to claim 7, wherein the total time of the heat-setting process at not less than 240° C. and a relaxation process of the biaxially oriented polyarylene sulfide film having a thickness of less than 50 μm is not less than 1 second and not more than 15 seconds.

10. The biaxially oriented polyarylene sulfide film according to claim 3, wherein a small endothermic peak immediately below the melting point in DSC of the film is not less than 250° C.

11. The biaxially oriented polyarylene sulfide film according to claim 3, which film has a layer comprising a polyarylene sulfide resin (B) in which at least one meta-arylene sulfide other than para-arylene sulfide is copolymerized on at least one side of the biaxially oriented polyarylene sulfide film.

12. The biaxially oriented polyarylene sulfide film according to claim 3, wherein the polyarylene sulfide is polyphenylene sulfide.

13. A method for producing a biaxially oriented polyarylene sulfide film according to claim 3, comprising stretching the film in the machine direction and the transverse direction such that the area stretching ratio is not more than 13-times and heat-setting the film after the stretching in not less than 2 steps each at different temperatures, wherein the heat-setting temperature in the first heat-setting step is not lower than 160° C. and not higher than 220° C. and the maximum heat-setting temperature in the second heat-setting step is not lower than 240° C. and not higher than 280° C.

14. The method for producing a biaxially oriented polyarylene sulfide film according to claim 13, wherein the total time of the heat-setting process at not less than 240° C. and a relaxation process of the biaxially oriented polyarylene sulfide film having a thickness of not less than 50 μm is not more than 1 second and not more than 30 seconds.

15. The method for producing a biaxially oriented polyarylene sulfide film according to claim 13, wherein the total time of the heat-setting process at not less than 240° C. and a relaxation process of the biaxially oriented polyarylene sulfide film having a thickness of less than 50 μm is not less than 1 second and not more than 15 seconds.

* * * * *